US010580314B2

(12) United States Patent
Schupp et al.

(10) Patent No.: US 10,580,314 B2
(45) Date of Patent: *Mar. 3, 2020

(54) METHOD AND SYSTEM FOR PILOT TARGET AIRCRAFT AND TARGET OBSTACLE ALERTNESS AND AWARENESS

(71) Applicant: Beeper Avionics Inc., Denver, CO (US)

(72) Inventors: Christopher Schupp, Lafayette, CO (US); Jay David Marks, Westminster, CO (US)

(73) Assignee: Beeper Avionics Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,944

(22) Filed: Jun. 26, 2019

(65) Prior Publication Data

US 2019/0333397 A1 Oct. 31, 2019

Related U.S. Application Data

(63) Continuation of application No. 16/166,068, filed on Oct. 20, 2018, now Pat. No. 10,380,902, which is a
(Continued)

(51) Int. Cl.
*G08G 5/04* (2006.01)
*B64D 45/00* (2006.01)
(Continued)

(52) U.S. Cl.
CPC .............. *G08G 5/04* (2013.01); *B64D 45/00* (2013.01); *G06F 3/013* (2013.01); *G06F 3/165* (2013.01);
(Continued)

(58) Field of Classification Search
CPC ...... G08G 5/04; G08G 5/0021; G08G 5/0078; G08G 5/045; B64D 45/00; G06F 3/013; G06F 3/165; G06F 3/167
See application file for complete search history.

(56) References Cited

U.S. PATENT DOCUMENTS 6,101,431 A * 8/2000 Niwa ..................... G01C 11/00
340/980
6,348,877 B1 * 2/2002 Berstis ................. G01C 23/005
340/961
(Continued)

OTHER PUBLICATIONS

Non-Final Office Action in U.S. Appl. No. 16/166,069, dated Jan. 3, 2019.

*Primary Examiner* — Sisay Yacob
(74) *Attorney, Agent, or Firm* — Cognition IP, P.C.; Bryant Lee

(57) ABSTRACT

There is provided systems and methods for pilot alertness and awareness of target aircraft and target obstacle that are flying within a proceeding flight path collision. Transmitted guiding sound signals consisting of three dimensional effects and tonal sounds are generated by a flight unit, and sent to the pilot's headset for the desired purpose of directing the pilot's head position to locate the target aircraft and target obstacle. The flight unit processes time of collision from received target aircraft broadcast, and contain at least GPS data and target obstacle information from stored navigational maps. The flight unit further receives the pilot's head position through means of a head tracker. Furthermore, the flight unit is able to perform the functions of, storing piloted flight information, voice language instruction, flight assisted notification, and communicating with one or multiple mobile devices such for the information to be displayed visually, and is upgradable remotely. There may also be provided configurable alerts for target aircraft and target obstacles.

20 Claims, 10 Drawing Sheets

Related U.S. Application Data continuation-in-part of application No. 15/260,287, filed on Sep. 8, 2016, now Pat. No. 10,140,878.

(60) Provisional application No. 62/216,901, filed on Sep. 10, 2015.

(51) Int. Cl.
 *G06F 3/01* (2006.01)
 *G06F 3/16* (2006.01)
 *G08G 5/00* (2006.01)

(52) U.S. Cl.
 CPC ........... *G06F 3/167* (2013.01); *G08G 5/0021* (2013.01); *G08G 5/0078* (2013.01); *G08G 5/045* (2013.01)

(56) References Cited

U.S. PATENT DOCUMENTS

| | | | | |
|---|---|---|---|---|
| 9,318,025 B2* | 4/2016 | Conner | ............ | G08G 5/065 |
| 9,390,559 B2* | 7/2016 | Feyereisen | ............ | B64D 45/00 |
| 2014/0267422 A1* | 9/2014 | Feyereisen | ............ | B64D 45/00 |
| | | | | 345/634 |
| 2015/0170525 A1* | 6/2015 | Conner | ............ | G08G 5/065 |
| | | | | 701/3 |

* cited by examiner

METHOD AND SYSTEM FOR PILOT TARGET AIRCRAFT AND TARGET OBSTACLE ALERTNESS AND AWARENESS

CROSS REFERENCE TO RELATED APPLICATION

This application is a continuation of application Ser. No. 16/166,068, filed Oct. 20, 2018, which is a continuation-in-part of application Ser. No. 15/260,287, filed Sep. 8, 2016, which claims the benefit of priority of provisional application: Application No. 62/216,901, filed on Sep. 10, 2015.

BACKGROUND OF THE INVENTION

The field of invention relates to methods and systems for pilot collision alertness and awareness of an aircraft and object in a flight collision path. In particular, some embodiments herein relate to systems and methods for using sound signals to direct the pilot's head position for the pilot to locate the aircraft and object in the flight collision path. In particular, some embodiments herein relate to a system of flight unit that determines and generates the sound signals into the pilot's headset to direct the pilot's head position for the pilot to locate the aircraft and object in the flight collision path, and thereby processes received aircraft, head tracker sensory, and stored target obstacle map information. In a further particular, some embodiments herein relate to methods and systems to graphically display three dimensional guidance information, such as a three dimensional arrow, shown on a mobile electronic device to direct the pilot's head position for the pilot to locate the aircraft and object in the flight collision path, and thereby the mobile electronic device processes received information from the flight unit, and further thereby the flight unit processes received aircraft, head tracker sensory, and stored target obstacle mapping information. The mobile electronic device herein is a portable computing device and may be wearable as known to those skilled in the art.

In general, pilot collision alertness and awareness systems and software applications thereof are for the purpose to avoid aircraft and obstacle collisions, and whereby to provide safety measures for the pilot to better navigate the airspace. This is necessary as the airspace environment ever more so becomes increasingly crowded, particularly with drone aircraft. Beneficially, pilot collision alertness and awareness systems and software applications thereof process all this information for the pilot. They detect and monitor aircraft and obstacles that may or do enter a flight collision path. And, notify the pilot in such away for the pilot to react accordingly as to the degree of collision danger. This includes the pilot to maneuver their aircraft to avoid collision or possibly communicate with other aircraft in the collision path.

SUMMARY OF THE INVENTION

It is desirable to develop systems and methods to provide a pilot as a means of using sound signals for guidance into the pilot's headset to direct the pilot's head position to locate one or multiple target aircraft and target obstacle, and in such a way for the pilot thereby to react instinctively. More particularly, it is desirable for the flight unit system further to contain controlling and sensory elements to function multi-purpose, including of receiving verbal commands and indicators utilizing speech language processing, particularly to configure flight unit properties, including adjusting one or multiple times of collision, store sensory flight information, and providing flight assisted feedback. This to achieve the objective for which the pilot continues flying the aircraft without causal interruption. And, additionally, wherein the flight unit is able to communicate with at least one mobile electronic device through means of wireless connectivity, and from received information that is processed by the flight unit. The thereby information processed is of at least receiving target aircraft information and stored navigational maps containing target obstacle, as well as, the pilot's head position through the means of a head tracker sensory unit tracking the pilot's head position. This further include sensory information and speech language commands, which are visually displayed on the mobile electronic device, and wherein at least one guidance information, such as a three dimensional arrow, guiding the pilot's head position for the pilot to locate one or multiple target aircraft and target obstacles. Some embodiments herein, among other things, solve these needs by providing the systems and methods taught herein.

Thus herein is provided are flight collision and awareness systems and methods for the pilot to track at least one target aircraft and target obstacle, wherein having a flight unit that contains a broadcast receiver described herein of radar, radio, laser, and the like collecting and interpreting standard aircraft broadcast signal of said protocol, and other non-radar wireless broadcast signal, such as Wi-Fi, and Wi-Lan, and those known to those skilled in the art; the flight unit further contain the elements of at least one controller, whereby the controller identifies surrounding aircraft, processes the aircraft information, and determine if the aircraft is within a time of collision; there is a head tracker unit affixed to the pilot's headset or pilot's head garment and glasses consisting of sensors to determine the position of the pilot's head, and transmits this information to the flight unit; the flight unit calculates the direction of motion for the pilot's head to move so it locates the target aircraft, and then sends a sound signal to an audio synthesizer element that produces a particular sound signal in the pilot's headset channel indicative of the motion to direct the pilot's head position to move in such a way for the pilot to the locate the target aircraft and target obstacle.

This system and methods wherein the flight collision and awareness flight unit generates sound signals consisting of three dimensional sound effects to guide the pilot's headset position to the location of the target aircraft and target obstacle that is ear specific to right and left or both; further this sound signal provides guidance to each ear specific when the target aircraft and target obstacle location is ahead or behind the pilot's head position; the type of sound signal may additionally indicate multiple aircraft based on a time of collision of first aircraft or obstacle, second aircraft or obstacle and so forth aircraft and obstacle; the sound signal further may produce a tone that changes in intensity volume for directing the pilot's head position when the target aircraft and target obstacle is ahead or behind to location.

There is provided an embodiment of the flight collision and awareness systems and methods, wherein the flight unit further generates tones that have variations, including tone modulation, such as a tremolo effect, phase such as a Doppler effect, to indicate ahead or behind of the target aircraft and target obstacle location.

Additionally, these system and methods wherein the flight collision and awareness having a flight unit that hereby processes received target aircraft and surrounding aircraft, the head tracker sensory, and stored target obstacle map information; and containing a controller element that stores this information, performs calculations, and is able to communicates wireless with at least one mobile electronic device by means of Bluetooth; there may be further one or multiples sensors to collect the flight information; these informations are visually displayed by the mobile electronic device, whereby the information is three dimensional guidance information, such as three dimensional arrow to guide the pilot's head position to the one or multiple target aircraft and target obstacles.

There is yet provided an embodiment of the flight collision and awareness systems and methods wherein the pilot's head position is simultaneously guided by means of both sound signals and visually displayed on a mobile electronic device to locate the target aircraft and target obstacle; the sound signals are sent from the flight unit into the pilot's headset, and the flight unit further transmits to the mobile electronic device the processed flight unit information of directing the pilot's head position to the location of the target aircraft and target obstacle; and this is visually displayed by means of three dimensional guidance information, such as a three dimensional arrow shown by the mobile electronic device.

There is yet further provided an embodiment of the flight collision and awareness systems and methods wherein the information is sent to/from the mobile electronic device and flight unit; this may be flight aircraft information, target aircraft information, weather, and flight assisted information, navigational maps, and controlling the configurations of one or multiple times of collision; that is graphically displayed by the mobile electronic device and further capable of speech language processing of verbal commands to change the configurations of the flight unit, provide flight assisted information; and additionally, the mobile electronic device is capable of sending head tracker sensory information of the mobile electronic device as part of the flight unit receiving data, flight GPS data, and the like; and moreover, perform interpolation of the flight GPS data to determine the pilot's head position relative to the aircraft, this for example, the pilot is viewing in their line of sight out the cockpit to the ground of the passengers seat, at the instrument panel, and backwards.

The flight collision and awareness methods and systems wherein the flight unit contains sensory element devices; these capture flight aircraft data by means of at least one sensor connected to at least one controller; the flight aircraft data include flight coordinates, flight pattern, identifier, flight behavior characteristic, and the like; the flight aircraft data may be stored, deciphered, interpreted, and computed, and this information may be sent to/from the controller to a mobile electronic device by means of wireless communication for purposes to visually display flight information, including data analysis of target aircraft and flight information.

These systems wherein the flight collision and awareness system of the flight unit may employ a tunable physical knob as a means for adjusting at least one time of collision of target aircraft and target obstacle, whereby the physical knob is a tunable switch causing the controller to thereby adjusted the time of collision.

There is provided an embodiment of the flight collision and awareness system of the flight unit having the elements of voice recognition system, including at least one microphone, and language processing chip, as this is in addition to producing sound signals; wherein, the controller is connected to the voice recognition chip; the controller interprets these verbal commands to perform at least tasks and supplies data; the task of supplied data may comprise of reading sensory data, and/or data providing calculation, identify target aircraft characteristics; the characteristics may be heading, target aircraft magnitude, and time of collision; and, further the flight information is assisted flight data; this information is verbally sent to the pilot for the purpose of flight behavior correction, heading position, and configuration of flight unit; this information is sent from the controller to the audio synthesizer, or directly from the voice recognition chip to the audio synthesizer.

There is further provided an embodiment of the flight collision and awareness system of the flight unit, wherein the flight assisted data is collected by the said flight unit sensors and information from at least one sensor element, and communicated wireless by means of Bluetooth, and the like, from a mobile electronic device; the data collected may include, real-time mapping data, including without limitation, LIDAR, at least one camera or a combination of these; the flight unit is programmed to determine from this, and stored flight behavior navigation maps, and from real-time collected data, such as location of target obstacles, weather conditions, landing approach, take-off, and pilot heading the flight assistance data; and further this data may be visually displayed by a mobile electronic device.

Moreover, the forgoing systems and methods may also employ ahead tracker comprising of at least a compass, battery, and transmitter; and may further comprise of a yaw sensor and inertial measurement unit. The head tracker may include at least a laser, photo-emitter, such as infrared diodes, and photodetectors as part of or affixed to the pilot's headset, head garment, glasses, a head unit mobile electronic device, or portable mobile electronic device. Yet moreover, the forgoing systems and methods may further be affixed, and comprise of a group of at least one Velcro, fastener, snap, and adhesive.

And, yet moreover, the forgoing systems and methods may be powered using a battery for the flight unit, any elements of the flight unit, and the head tracker unit; and, these systems and methods yet may employ power from the aircraft itself, and yet these systems and methods may further employ at least one solar cell and inverter.

One of ordinary skill in the art will recognize, based on the teachings set forth in these specifications and drawings, that there are various embodiments and implementations of these teachings to practice the embodiments herein. Accordingly, the embodiments in this summary are not meant to limit these teachings in any way.

DESCRIPTION OF THE DRAWINGS AND THE PREFERRED EMBODIMENTS

Figure 1:
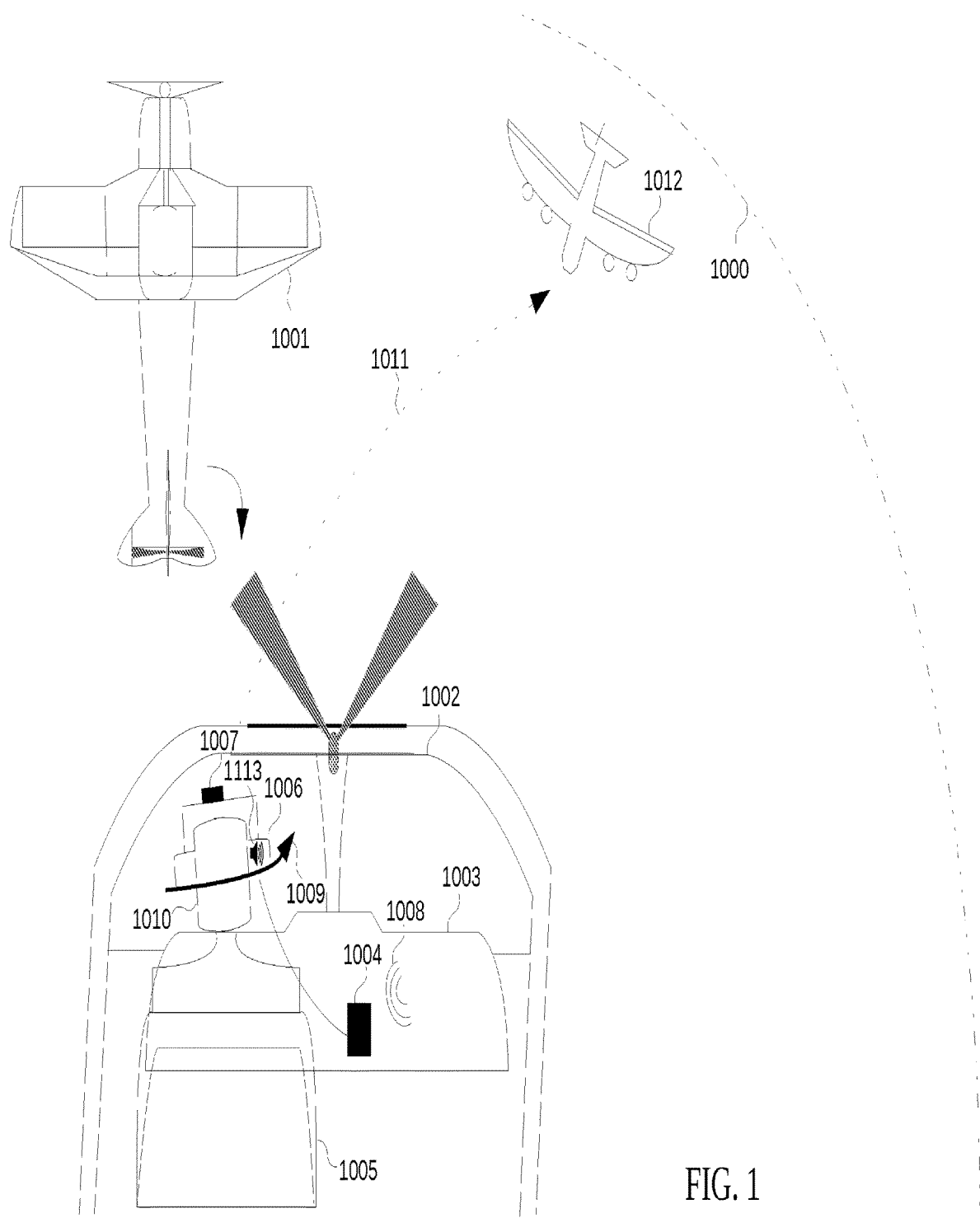
FIG. 1 is a graphical representation of an example of a system of some embodiments of a pilot's head position guided for the pilot to the location of a target aircraft using sound signals.

As used herein, unless specified otherwise "target aircraft" means an aircraft that is piloted or is unmanned that enters a predetermined collision path, such that, if unchanged, will lead to a collision.

As used herein, unless specified otherwise "target obstacle" includes terrain, such as, ground, mountain, ocean, and the like; and ground obstacles, such as, towers, wires, structures, and the like; and restricted airspace, such as, airport and military zones, and the like.

As used herein, unless specified otherwise, the "navigation map" contains information of target obstacle information, and additionally, nearby airports, airspace, airport information, nearby cities, landmarks, minimum recommended altitudes, restricted zones, and the like.

As used herein, unless specified otherwise "time of collision" means a resulting predetermined time that the target aircraft or target obstacle collision will occur if both remain on the same course. This, for example, a jet aircraft having the same time of collision as a small propelled aircraft of lesser collision path magnitude, because when accounting for the jet aircraft having a greater velocity.

As used herein, unless specified otherwise, a "flight unit" should be given its broadest possible meaning, or of any other terms commonly used or known in the art, and include the following: receiving signal from surrounding aircraft, storing navigational map andtarget obstacle information, receiving/transmitting pilot guiding generated sound signals, sending and receiving verbal and wireless information; and, whereby processing the receiving and of the stored information for the purposes without limitation of, calculating time of collision, verbal system configuration and feedback, and information to transmit to the mobile electronic device to visually display the information graphically.

As used herein, unless specified otherwise, a "controller" should be given it's broadest possible meaning, or any other terms commonly used or known in the art, and include any computer that reads/writes to memory, at least one processor, and operating software that is programmable to operate. The controller is capable of supporting broadcast signal protocol from varying receivers. This, for example, is Wi-Fi, Ethernet port, Bluetooth, Mode C, Mode S, Mode 3A or A, ADS-B and of further ground station broadcast TIS-B, ADS-R, and the like, understood by those skilled in the art.

In the conventional ways of target aircraft collision alertness and awareness, the pilot reads a graphical display that describe the properties of one or multiple target aircraft on a collision path. These systems may additionally use verbal indicators from/into the pilot's headset, and include information of target aircraft heading, avoidance maneuvering instructions, such as move up or down, and sounds to notify the pilot there is a target aircraft and to alert the pilot to read the visual display graphically showing the collision information of the target aircraft and target obstacle. And, wherein, the properties of the graphical display of target aircraft and target obstacle of without limitation may be vertical speed, relative position, navigation map information, and flight course.

There are however drawbacks of the said conventional ways of present for target aircraft collision alertness and awareness systems and software applications thereof. The pilot reading the visual display to identify the target aircraft and target obstacle location may be subsequently consuming and complicated to interpret during the time of collision scenario. When the pilot receives target aircraft and target obstacle verbal indicators, this information received by the pilot further can be confusing when having to locate the target aircraft or target obstacle. Thus, there is a need for the pilot to locate the target aircraft and target obstacle being simpler and more intuitive. Some embodiments herein address the described needs by means of generated sound signals in the pilot's headset, which particularly consist of guiding three dimensional effects and tones, to direct the pilot's head position for the pilot to locate the one or multiple target aircraft and target obstacles in an intuitive manner.

Thus, some embodiments herein address and provide solutions to these and other needs in collision alertness and awareness by systems of a flight unit to determine the receiving target aircraft and target obstacle information being stored in navigational maps, as well as, the pilot's head position through the use of a head tracker sensory unit that navigates the pilot's head position, of which to generate the appropriate sound signals guiding the said pilot's head position for the pilot to locate the one or multiple target aircraft and target obstacles. The present invention further addresses the flight unit being multi-purpose. This include the capability of speech language processing, so that the pilot is able to configure the time of collision and properties of the generated sound signals using verbal commands, and data to be visually displayed on at least one mobile electronic device. Additionally, for the flight unit to capture flight information by means of navigational sensors to record the pilot's flight behavior, and moreover, to provide flight assisted feedback. Some embodiments herein yet further address the flight unit to communicate with at least one mobile electronic device, whereby providing graphical representation guidance methods to direct the pilot's head position for the pilot to locate one and multiple target aircraft and target object.

In general, some embodiments herein relate to systems and methods for use in pilot traffic alertness and awareness using sound signals in the pilot's headset for the pilot's head position to be guided to the target aircraft and target obstacle location. The pilot to locate the target aircraft using sound signals in the pilot's headset is instinctive and seamless, this is because some embodiments herein provide sound signals that are of a natural neuro-stimuli for the pilot to comprehend in guiding the pilot to locate the target aircraft and target obstacle. This by the use of sound signals consisting of three dimensional audio effects and tonal sensations. In particular, the systems and methods of the pilot traffic alertness and awareness is a flight unit of controlling and sensory elements that generate appropriate sound signals, and thereby process the pilot's head position, receiving aircraft and stored navigational map target obstacle information; and additionally sending information to at least one mobile electronic device for the purpose of visually displaying guiding information directing the pilot's head position for the pilot to locate the target aircraft and target obstacle. Further, the use of verbal speech language feedback, whereby the pilot speaking into the pilot's headset to configure the flight unit properties, and further visually displaying mobile electronic device information, and collision awareness and alertness sound signal capability, and thus making the flight unit system multi-purpose. Some embodiments herein, among other things, solve these needs by providing the systems and methods taught herein.

Thus, in general, and by way of example, there is provided in FIG. 1 a target aircraft 1012 flying within a time of collision 1000 depicted by a virtual 360 degree airspace zone. The calculation for time of collision by example may be linear, bilinear interpolation, non-linear interpolation, simultaneous localization and mapping techniques. Wherein, the data is received from the target aircraft broadcast including Doppler, GPS, and navigation and depth sensory information, and additionally without limitation, of other means, such as rotation, gravitation, angular velocity, pitch, roll, magnetic, optical, electromagnetic signal strength, acceleration, and the like, known by those skilled in the art.

FIG. 1 further provides a perspective view showing the aircraft 1001 the aircrafts cockpit 1002, and with a portable flight unit 1004 that is placed in the on instrument panel 1003, and receives requested aircraft signal 1008 received by the said flight unit of a target aircraft 1012. This flight unit is at least calculating for the time of collision, and capturing and interpreting the head tracker 1007 of the pilot's head position 1010 from sensory information, whereby the said head tracker is affixed to the pilot's headset 1006. The said flight unit receives the pilot's head position from the head tracker, and determines the target aircraft location 1011, and thus where the pilot's head position must be directed to locate the target aircraft 1009. The flight unit then generates sound signals 1113 in the pilot's headset directing the pilot's head position for the pilot 1110 to locate target aircraft location. The said directing pilot's head position is further of a 360 degree motion for the pilot to locate the target aircraft.

Figure 2:
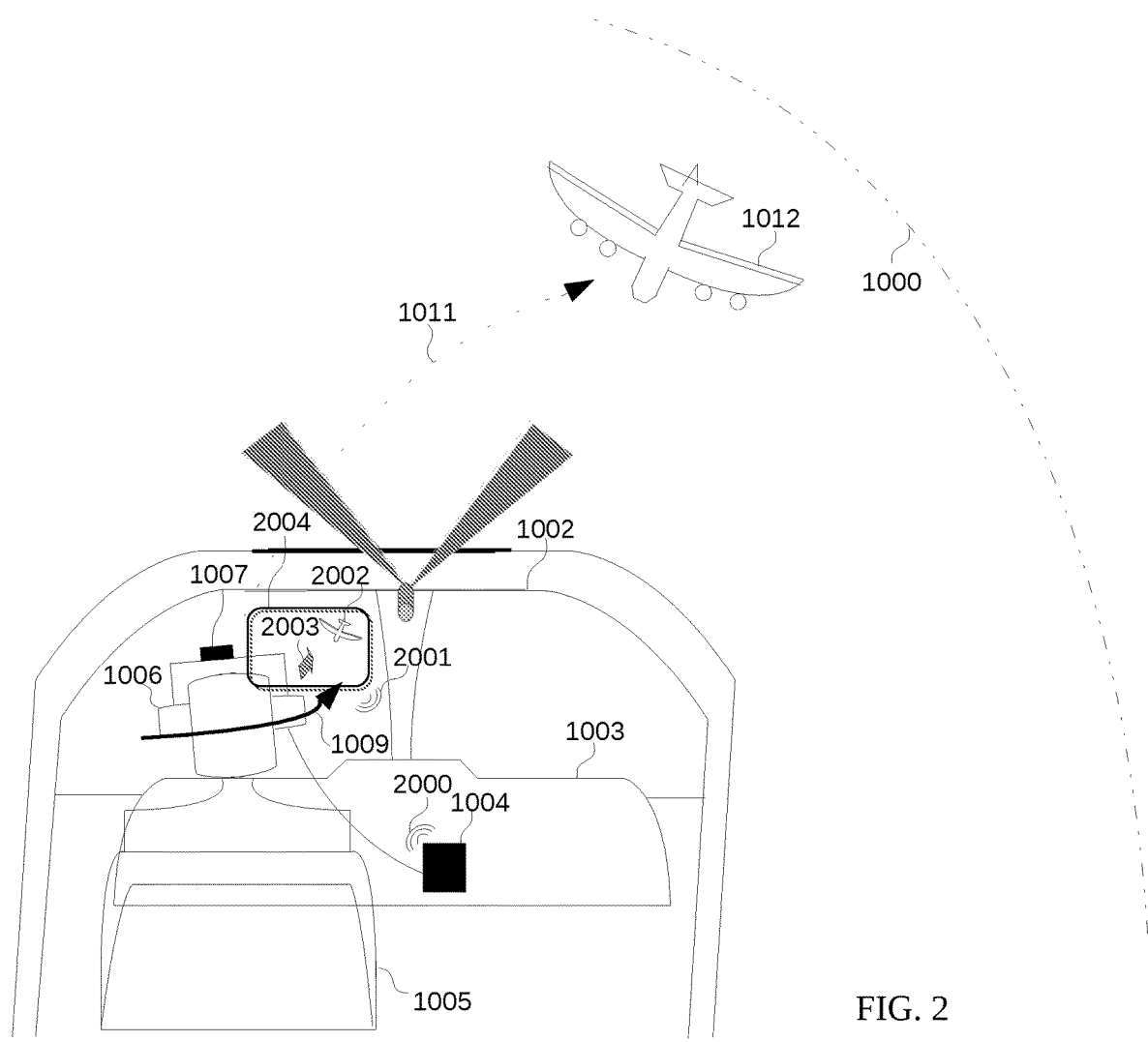
FIG. 2 illustrate the pilot locating a target aircraft from a visual display m communication with a flight unit.

Moreover, FIG. 2 presents further the head tracker 1007 communicating with the flight unit 1004 in the cockpit 1002 and a target aircraft 1012 has entered the time of collision 1000 from FIG. 1, wherein the said flight unit receives the data of the pilot's head position 1009 from the head tracker 1007 affixed to the pilot's headset 1 007 and determines the location and time of collision of the target aircraft 1011 This information is communicated wireless to 2000 the mobile electronic device 2004 to indicate the direction of aircraft using a 3 dimensional arrow 2003 and displayed pop-up location of the aircraft 2002 on the mobile electronic device display, and wherein the mobile electronic device communicates 2001 with the flight unit. Further other electronic devices may be employed, by way of example, such a project, transparent electronic display, and the like known to those skilled in the art may be used.

A first aspect, by way of non-limiting example, relates to the type of sound signals 1113 consisting of three dimensional sound effects and tonal sensations generated by the flight unit 1004, and the sound signals are heard in the pilot's headset 1006 as illustrated exemplary in FIGS. 1-2 to locate at least one target aircraft 1000. The three dimensional sound effect may be the same and varying intensity and same and varying with reverberations in the pilot's headset. The three dimensional sound effect is calculated by the said flight unit using a means of calculating at least one head-related transfer function, using filters, and z-transform, Fourier transform of single and multidimensional, the frequency response of the system, and the like known by those skilled in the art The three dimensional effecting sound signal in produced in accordance for the pilot to locate the target aircraft and target obstacle to each ear side. The three dimensional audio effect is interpreted to indicate to the sound location registered by the brain, wherein this may be of about eight side sounds in each ear with a such as front, right, front left, left, rear leaf, rear, and rear right directions, from about 16 side sounds in ear, from about 32 sounds in each ear, and, and about 32 sound or more in each ear. The three dimensional effect may vary by verbal sound with three dimensional effect, tonal sensation, and multiple verbal sounds and tonal sensations or a combination of these to indicate the target aircraft and target obstacle location in the pilot's headset.

As a further embodiment, the sound of pilots of two or more aircraft on a collision course, wherein each are notified by the said three dimensional effect sound signals in the pilot's headset, and where each pilot is to fly the aircraft to avoid collision in a predetermined time of collision and heading of the other aircraft. The flight unit can automatically communicate with another flight unit to coordinate the heading of each aircraft of the other pilot by means of receiving guiding sound signals in the headset to avoid the collision path of both aircraft. They may also be notified by sound signals to locate the other pilot's head direction and notification of directions to avoid one or multiple aircraft and obstacle direction using multiple three dimensional effects, tonal sensations, or a combination of these. In addition, if the flight unit is part of a drone, the drone is flown automatically by the flight unit once a predetermined flight collision is known, and the piloted aircraft receives guiding sound signals as to where to fly. This is not within limitation of flight, but aircraft taxiing, takeoff, and landing.

And, by way of example, the mobile electronic device graphically displays information from at least one three dimensional arrow signal directing the pilot's head position to the location of one and multiple target aircraft and target location. This may further be combined with sound signals into the pilot's headset to locate the one and multiple target aircraft and target location. The graphically displayed information from the flight unit further may include relevant flight information, target aircraft information, weather, navigational maps, and controlling the configurations of one or multiple time of collision that is graphically displayed by the mobile electronic device. This may be further capable by means of verbal commands to change the configurations of the flight unit stored by the mobile electronic device. This is of benefit particularly for heads up display, and augmented reality glasses, and use of portable computers, like smartphones to hold up and see information with quick visual response. And, as yet a further embodiment, pilot to locate two or more on a collision course, as each are notified by visual display, such as one or multiple three dimensional arrow, where each pilot is to fly the aircraft to avoid collision in a predetermined time of collision and heading of the other aircraft. They may additionally be also notified by sound signals to locate the target aircraft and target obstacle.

Systems and methods may further generally include one or more sound signals to indicate multiple target aircraft and targets obstacle one and thus multiple times of collision. The pilot is capable of receiving the sound signal consisting of three dimensional sounds and tones to indicate a first target aircraft and target obstacle, and a second sound signal to indicate a second, and so forth to indicate target aircraft and target obstacle. The configuration of the systems and methods further may have a single and multiple beeps to indicate a second aircraft, third aircraft, and so forth of target aircrafts and target obstacles within the time of collision. As an embodiment of the systems and methods, the pilot may configure verbal commands, whereby the flight unit contains voice recognition capability to define the sound signal and beep for target aircraft and target obstacle. As a second embodiment, the pilot can predetermine multiple sound signals and beeps for one and multiple time of collisions of target aircrafts and target obstacles. The methods and systems may have a set predetermined non-adjustable time of collision for safety of about 5 seconds, of about 10 seconds, of about 30 seconds, of about 1 minute, of about 3 minutes, and more than 3 minutes.

And, yet further the sound signal may further be discontinuous to allow the pilot to recognize more than one signal being sent in the pilot's headset indicating more than one target aircraft and target obstacle. The discontinuity of sound signal may be of about 1 second, of about 3 second, of about 5 second, of about 20 seconds, and more than 20 seconds. The discontinuity of the sound signal may have verbal information from the methods and systems, and of the following: verbal description of the sound signal, identification of target aircraft and target obstacle, meaning of the sound signal, such as target aircraft identified, and time of collision, and the like sent the pilot's headset during the discontinuity between sound signal, which does not produce a three dimensional sound.

In addition the sound signal providing target location guidance for the pilot in the pilots headset are tonal sensations. The tone properties may be a variation in intensity of modulation, such as a tremolo effect, variation in phase, or a combination of these. The tremolo effect, for example, is stronger when the pilot's head position is turned to the location of the target aircraft and target obstacle, and weaker when turned away as the signal will grow weaker.

And, further in addition, in accordance with one or more aspects of the systems and methods, the sound signals indicate flight assisted behavior. The said sound signals consisting of three dimensional audio effects, tone, and mixed verbal commands, or a combination thereof offering flight notification instructions. This for example, landing and aligning with the airstrip as the aircraft is needed to be tilt based on navigational stored maps and possibly camera and LIDAR information, wherein the sound signal intensity is three dimensional to indicate the airplane movement without having to visualize instrument data with verbal commands, such as move the aircraft left, and as the pilot moves the aircraft left, the sound signal grows weaker when reaching the right alignment position. The flight assisted information is without limitation to additionally being graphically displayed by a mobile electronic device transparent display, and projector with the said sound signals.

Figure 3:
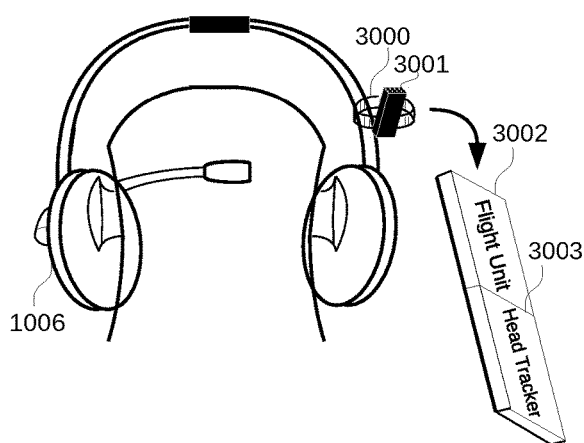
FIG. 3 illustrate exemplary a flight unit affixed to a headset as a pilot's head position is guided for the pilot to the target aircraft.

As a second aspect, the flight tracking and awareness methods and systems relate to FIG. 3, wherein the flight unit 3001 is detachable and affixed 3000 to the pilot's headset 1006 and the head tracker unit 3003 connected to the flight unit 3002 is embedded to the flight unit to form a single unit. The head tracker as an embodiment of the second aspect, may be embedded in the mobile electronic device that is worn by the pilot.

The affixed systems and methods thereof of the flight unit, elements of the flight unit, and head tracker, and any other object are affixed by means comprising of Velcro, fastener, magnet, strap, and the like to the pilot garments, parts of the cockpit, and pilot's headset. Further of the methods and systems, the flight unit, head tracker, and aspects the flight unit may be affixed or embedded to and inside a mobile electronic device.

The systems and methods pertaining to an aircraft flight environment, the flight unit, head tracker, and any elements of the pilot traffic alertness and awareness system using sound signals in the pilot's headset directing pilots head position to locate target aircraft is to withstand flight environment vibrations, buffet, and flutter, and encased with such materials comprising of steel, plastic, titanium, and the like to also withstand flight vibration, buffet, and flutter.

The Flight Unit.

For systems of the general type illustrated in FIGS. 1-2, the pilot locates target aircraft by means of listening to directional sound signals generated in the pilot's headset, with at least the elements of a head tracker and flight unit to provide the pilot head position and target aircraft time of collision. The flight unit performs the desired functions of transmitting and receiving aircraft broadcast signal, storing data including without limitation wireless transmitted/received mobile electronic devices, receiving flight protocol signal of surrounding aircraft and navigational mapping data information, including target obstacles, and to perform calculations of the said information, and receiving and sending guiding sound signals into the pilot's headset, and further without limitation verbal commands and verbal information of flight information and assisted flight information. The flight unit in its simplest form of configuration comprises of the elements of a said broadcast receiver collecting and interpreting aircraft standard signal and new protocols including Wi-Fi, Wi-Lan, and the like known to those skilled in the art, and at least one controller, preferably a single board computer, generating sound signal in the pilot's headset, or sending the generated sound signal information to a mobile electronic device to generate the pilot's headset the sound signal, and an audio synthesizer, which may include at least one speaker.

Figure 4:
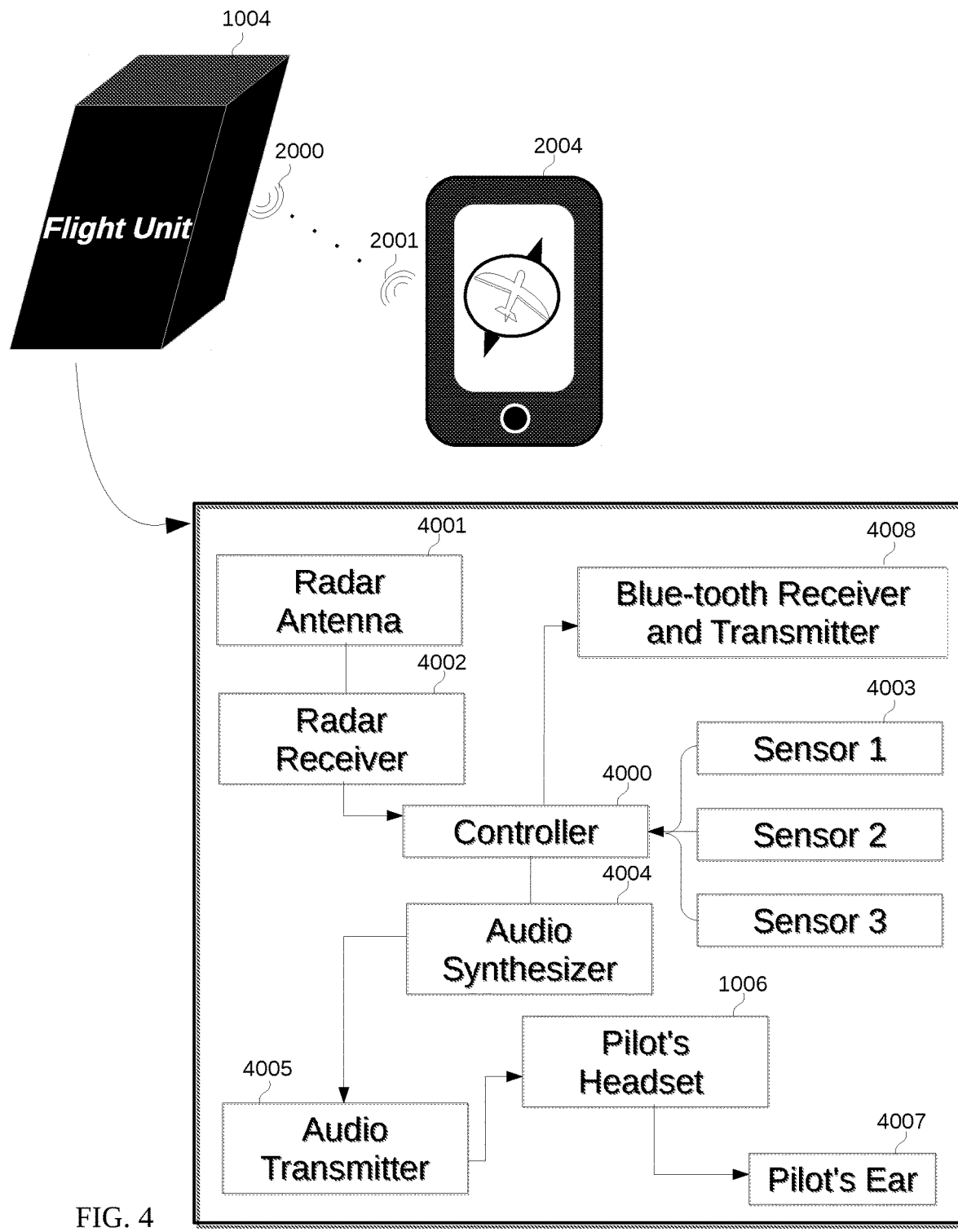
FIG. 4 is a schematic diagram example of a flight unit configuration.

For systems of the general type illustrated in FIG. 1, by way of example, the schematic diagram illustrated in FIG. 4 showing the flight unit 1004 communicating to the mobile electronic device 2000 and the mobile electronic device 2004 to communicate 2001 with the flight unit, wherein the flight unit elements comprise of a controller 4000 that serves as the central computer connecting multiple sensors 4003, and without limitation navigation sensors that include GPS, magnetometer, altimeter, yaw, accelerometer, gyroscope, compass, altimeter, air speed indicator, inertial reference unit, gimbal, and variometer; and non-navigational sensors that include at least one, voice recorder, microphone, voice recognition chip, sound chip, Wi-Fi receiver, Wi-Lan receiver, with an radio antenna 4002 to receive signal from the said controller and radio antenna 4001 to broadcast signal to request said aircraft receiving data, an audio synthesizer 4004 and transmitter 4005 to then send audio signal instructions to an audio synthesizer into the pilot's headset 1006 and thereby the pilot's ear 4007, and Bluetooth transmitter/receiver 4008 to said communicate with a mobile electronic device.

In accordance with one or more aspects of the flight unit system and methods, the flight unit additionally having the ability of a controller with the additional function of storing navigational mapping of data, specifically of target obstacles. The information provides the pilot a means for tracking target obstacles and generating sound signals when the target obstacles enters a time of collision. The flight unit may receive sensory data from other wireless mobile electronic devices, for example, a magnetometer, altimeter, yaw, accelerometer, gyroscope, compass, altimeter, air speed indicator, inertial reference unit, gimbal, and variometer, and other data, such as, navigation maps, weather, remote software changes/upgrades to provide information to pilot's that is verbal or use the information to generate sound signals based on the flight information feedback.

Figure 5:
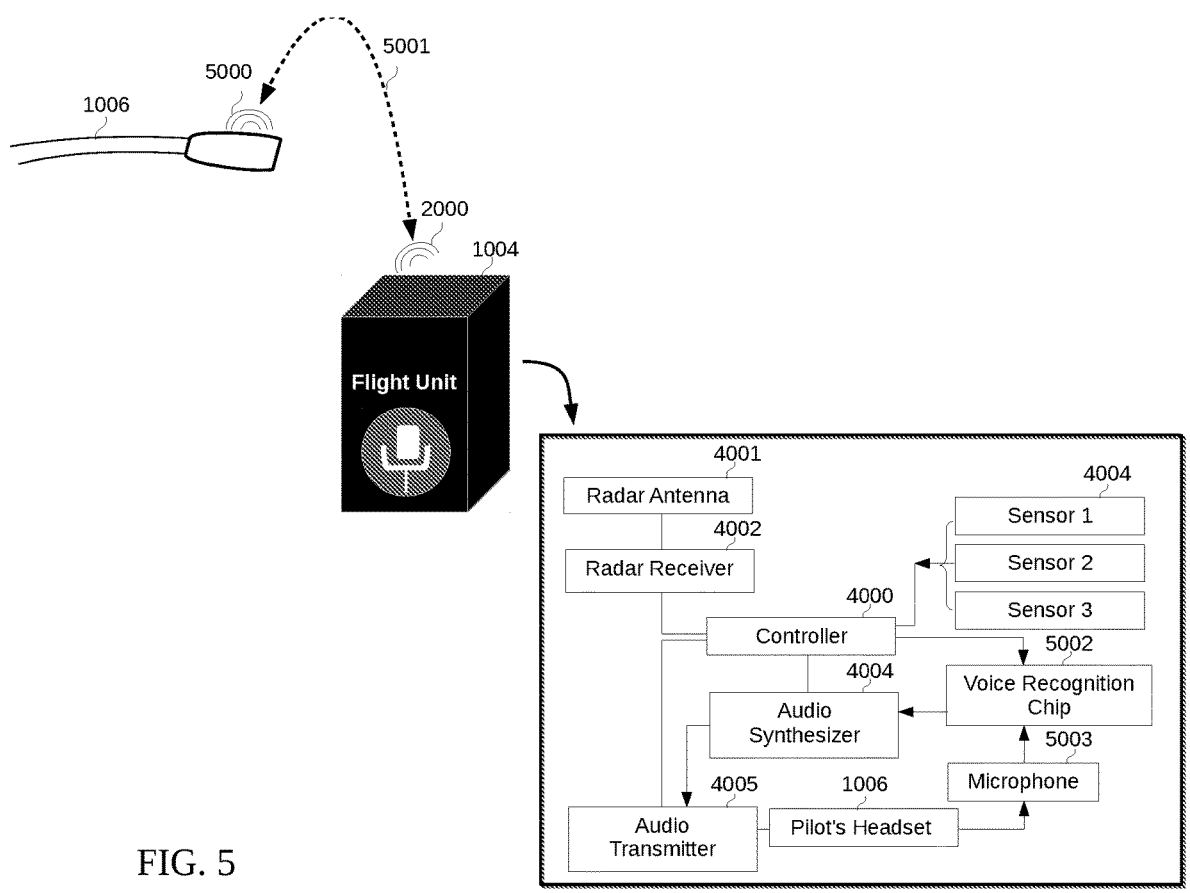
FIG. 5 is a schematic diagram of an exemplary flight unit configuration with speech language processing feedback.

There is further provided the flight unit having the capability of speech language processing of verbal information sent from/to the pilot's headset produced by the audio synthesizer from a controller, which may be connected to a speaker, microphone, and voice recognition processing integrated chip. A further illustrate of the flight unit with voice processing is shown in FIG. 5, wherein the pilot is able to speak in their pilot headset's 1006 and request by voice 5000 aircraft information 5001, including time of collision, identification of target aircraft, configuration of the flight unit software, and like to the flight unit 1004, which is able to send said aircraft information of particularly voice speech 2000. The flight unit includes further a voice recognition chip 5002 and microphone 5003 to receive voice from pilot from the flightunit shown in FIG. 4, processed by a controller 4000 with a radio antenna 4002 to receive signal from the said controller and radio antenna 4001 to broadcast signal to request said aircraft receiving data, an audio synthesizer 4004 and transmitter 4005 to then send audio signal instructions and additionally voice to an audio synthesizer into the pilot's headset 1006 and thereby the pilot's ear 4007, and Bluetooth transmitter/receiver 4008 to said communicate with a mobile electronic device. In this case, for example, the time of collision information may be processed from the pilot's voice commands, and displayed on mobile electronic device, as well as, piloted aircraft speed 5002, and data of target aircraft heading 5003. Further, the pilot may receive a verbal response from the flight unit triggered by the controller and sent from the audio synthesizer of FIG. 5. The said controller is able to provide the sound signals thereby to direct the pilot's head position for the pilot to locate the target obstacle from stored navigation data entering a predetermined time of collision of shown in FIG. 2.

Figure 6:
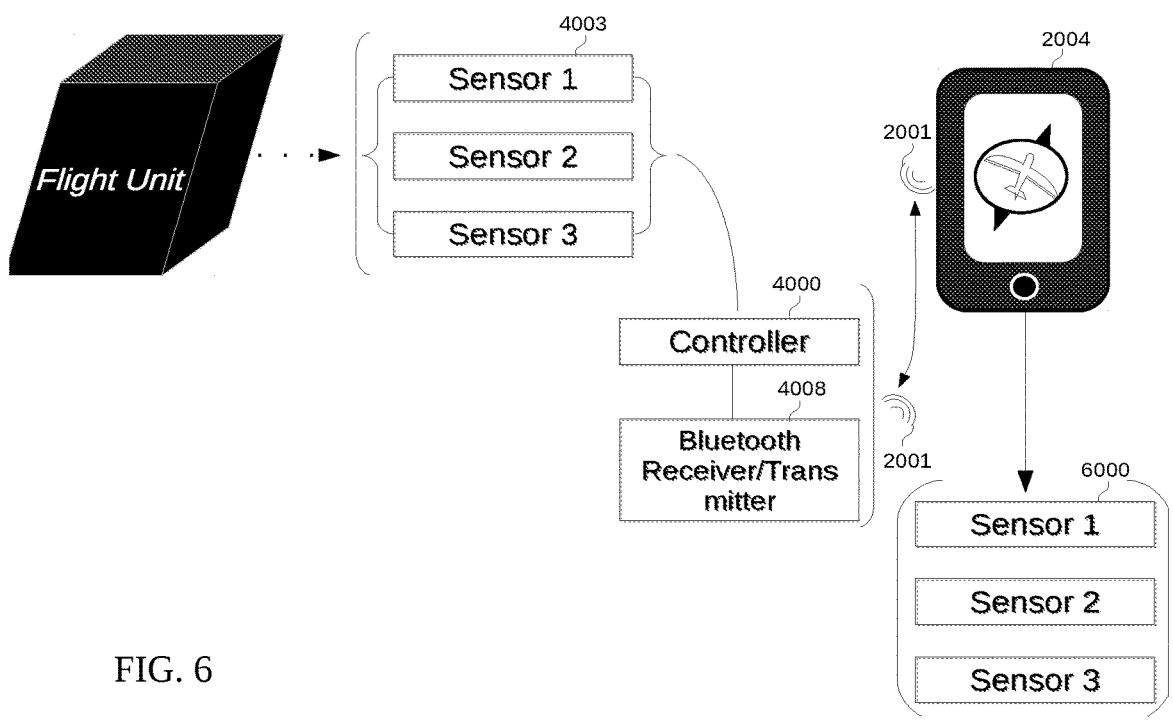
FIG. 6 illustrate a flight unit communicating it's sensory information with an
external mobile electronic device.

In FIG. 6, is shown as an illustrate of the flight unit 1004 communicating wireless 2001 from a mobile electronic device 2004, and the transmitting and receiving sensory data of target aircraft 6000 and flight sensory information 4003 with a controller 4000 and Bluetooth receiver/transmitter 4008, with the information of sensory may be navigation data, voice commands, remote upgrades of the flight, and configuration of the flight unit.

In some further aspects of the flight unit systems and methods, the at least one controller element may receive target aircraft and flight information for a variety of other purposes and include without limitation the pilot analyzing pilot flight pattern, weather reports, flight heading, and to generate verbal and sound information into the pilot's headset for such purposes. This, for example, flight management information wherein, the pilot is verbally informed the direction to set a course, and further example of, the piloted aircraft descending too fast on approach of a landing and the pilot should check their decent pattern or to reduce descent rate.

It is thus an aspect of some embodiments to remotely upgrade the software in the flight unit from a mobile electronic device by means of Bluetooth, this for example, the mobile app downloading a software upgrade in the software application, and to transfer the upgraded information to the flight unit software. The software mobile app may be upgraded to include new versions of software, such as weather display, notification information, flight information data graphs, and the like. The flight unit may be upgraded to include new speech processing, configuration of flight unit information, and the like.

It is readily understood in the art that the terms flight unit, as used herein is used in is used in its broadest terms and thus may also refer any elements are powered by at least one battery either part of the element or battery powering this and multiple elements.

The Head Tracker.

The head tracker in general performs the desired functions of determining the pilot's head position and comprising of navigation sensors of the simplest elements being a compass, transmitter to relay pilots head position information to the flight unit, and at least one source of power that hereby powered by at least one battery.

The present methods and systems and in particular the head tracker, may include further from the simplest elements without limitation at least one GPS, magnetometer, altimeter, yaw, accelerometer, gyroscope, compass, variometer, and the like, wherein the system element configurations to navigate the pilot's head position is known to those skilled in the art.

Figure 7:
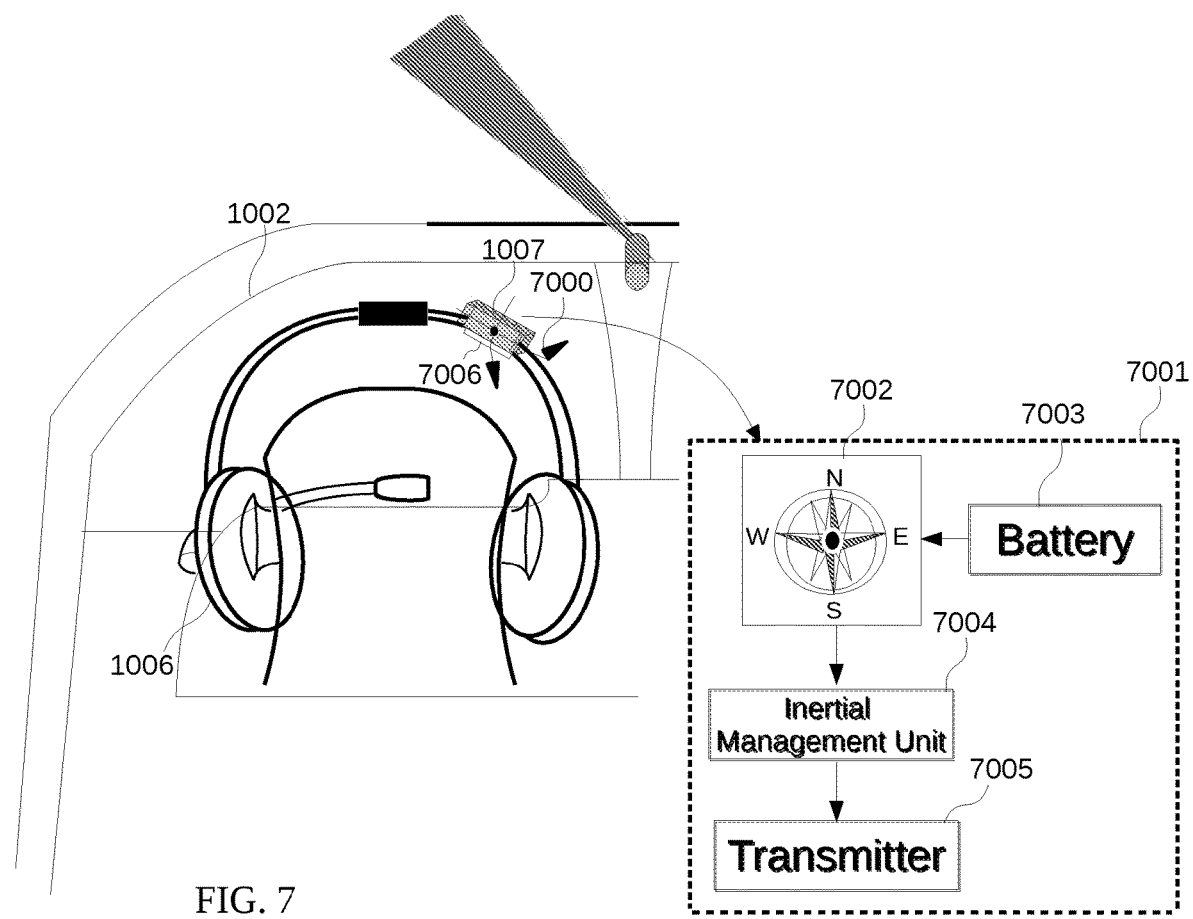
FIG. 7 schematic diagram exemplary of a head tracker sensory unit configuration.

Thus by way of example, as illustrated in FIG. 7 the head tracker 1007 is affixed 7006 to the pilot's headset 1006 with the unit transmitting to the flight unit 1004, wherein the said head tracker determine the direction of the pilot's head relative to the position of the aircraft 7000. The elements of the head tracker unit 7001 consist of a compass 7002, inertial measurement unit 7004, transmitter 7005, and powered by a battery 7003. The transfer of information to the flight unit is in the form of Bluetooth, Wi-Fi, Radio Frequency, or a combination of these.

Figure 8:
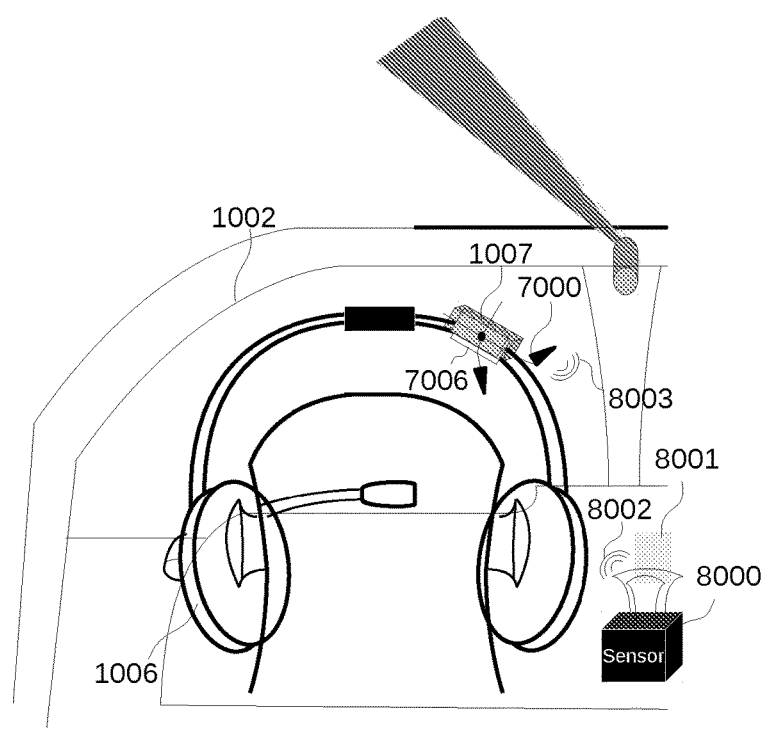
FIG. 8 illustrate the head tracker unit calibrated to the pilot's head position and airplane by means of an unattached communicating sensor.

Furthermore, and by way of example, as illustrated in FIG. 8 from FIG. 7 of a head tracker 1007, the head tracker may communicate with an external sensor 8000 that communicates 8002 with the said head tracker affixed 8001 to the cockpit 1002, to determine the position of the aircraft and the said head tracker calibrates the position of the pilot's headset 1006 position to the said aircraft 7000 for the purpose of receiving the position of the pilot's head relative to direct the pilot by to measure the pilot's cockpit angular velocity around its vertical axis., wherein the head tracker is affixed 7006 to the said pilot's headset. The external may be at least a yaw sensor Yet furthermore, and by way of example, the head tracker may be embedded in the pilot's headset, mobile electronic device, affixed to the pilot's garment, and packaged in an augmented reality or heads up display, and the like.

The flight unit and mobile electronic device may test the head tracker to determine if the head tracker is removed from the pilot's headset by using software as a means to determine if the head tracker is producing a head motion and instructs a sound signal that is either a beep, verbal, or tone into the pilot's headset to affix the head tracker to the pilot's headset, low battery by communicating with the flight unit.

Figure 9:
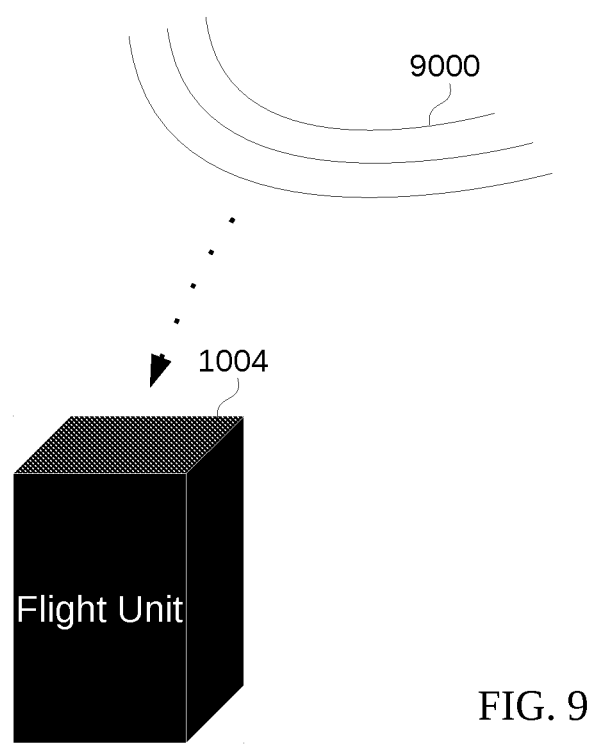
FIG. 9 illustrate the flight unit is receiving a non-standard aircraft protocol.

In FIG. 9, the flight unit 1004 is receiving a non-standard target aircraft protocol 9000 of Wi-Fi, Wi-Lan, and those known skilled in the art This may be preferably a drone signal that is not a said standard signal.

Some additional embodiments relate to the use of configurable alerts in a traffic aircraft and target obstacle awareness system.

A Traffic Collision Avoidance System (TCAS) is an aircraft collision avoidance system designed to reduce the incidence of mid-air collisions between aircraft. TCAS monitors the airspace around an aircraft for other aircraft equipped with a corresponding active transponder and warns pilots of the presence of other transponder-equipped aircraft which may present a threat of mid-air collision. TCAS and other air traffic collision avoidance systems are mandated by some aviation organizations for aircraft above certain threshold sizes.

TCAS involves communication between all aircraft equipped with an appropriate transponder. Each TCAS-equipped aircraft interrogates all other aircraft in a determined range about their position, and all other aircraft reply to other interrogations. This interrogation-and-response cycle may occur several times per second. The TCAS system builds a three dimensional map of aircraft in the airspace, incorporating their range (garnered from the interrogation and response round trip time), altitude (as reported by the interrogated aircraft), and bearing (by the directional antenna from the response). Then, by extrapolating current range and altitude difference to anticipated future values, it determines if a potential collision threat exists.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of configuring alerts for an aircraft piloted by a pilot, the method including: receiving an indication of a target, the indication including a range from the aircraft to the target, a rate of closure of the target to the aircraft, and an estimated time to collision between the aircraft and the target. The method also includes receiving a sensitivity control setting, the sensitivity control including a threshold time to collision or a threshold range to the target. The method also includes determining an alert condition based on a comparison of the indication of the target with the sensitivity control setting. The method also includes receiving a direction of the pilot's gaze. The method also includes playing an audio announcement via a headset of the pilot announcing the target and a direction of the target. The method also includes playing a doppler effect tone via the headset including a series of tones played at a rate determined by the rate of closure between the aircraft and the target. The method also includes playing a lock on tone via the headset when the relative difference between the direction of the pilot's gaze and the direction of the target aircraft is above a threshold and deactivating the lock on tone when the relative difference between the direction of the pilot's gaze and the direction of the target aircraft is below the threshold. The method also includes where the doppler effect tone, and the lock on tone are played using a three-dimensional audio effect to simulate the doppler effect tone, and the lock on tone coming from the direction of the target aircraft relative to the direction of the pilot's gaze. Other embodiments of this aspect include corresponding computer systems, apparatus, and computer programs recorded on one or more computer storage devices, each configured to perform the actions of the methods.

Implementations may include one or more of the following features. The method where the sensitivity control includes a threshold range, and where the alert condition is determined in response to determining that the distance from the aircraft to the target is below the threshold range. The method where the sensitivity control includes a threshold time to collision, and where the alert condition is determined in response to determining that the estimated time to collision between the aircraft and the target is shorter in duration than the threshold time to collision. The method where the direction of the pilot's gaze is received from a head-tracking unit attached to the headset. The method where the direction of the pilot's gaze is determined by analyzing images of the pilot. The method further including: determining an end to the alert condition; and playing an audio announcement via the headset announcing the end of the alert condition. Implementations of the described techniques may include hardware, a method or process, or computer software on a computer-accessible medium.

One general aspect includes a method of alerting a pilot of an aircraft about a potential collision with a target, the method including: receiving a direction of the pilot's head relative to the aircraft. The method also includes receiving a direction of the target relative to the aircraft. The method also includes determining an angle of the target relative to the direction of the pilot's head based on comparing the direction of the pilot's head relative to the aircraft and the direction of the target relative to the aircraft. The method also includes playing a tone when the angle of the target relative to the pilot's head is greater than a threshold angle, where the tone is played through a headset of the pilot using a simulated three-dimensional audio effect to create a perception that the tone is emanating from the angle of the target relative to the pilot's head. Other embodiments of this aspect include corresponding computer systems, apparatus, and computer programs recorded on one or more computer storage devices, each configured to perform the actions of the methods.

Implementations may include one or more of the following features. The method further including muting the tone when the angle of the target relative to the pilot's head is lower than the threshold. The method where the simulated three-dimensional audio effect includes processing the tone with a head-related transfer function. The method further including modulating an intensity of the tone based on the angle of the target relative to the pilot's head. Implementations of the described techniques may include hardware, a method or process, or computer software on a computer-accessible medium.

The details of one or more implementations of the subject matter described in this specification are set forth in the accompanying drawings and the description below. Other potential features, aspects, and advantages of the subject matter will become apparent from the description, the drawings, and the claims.

Figure 10:
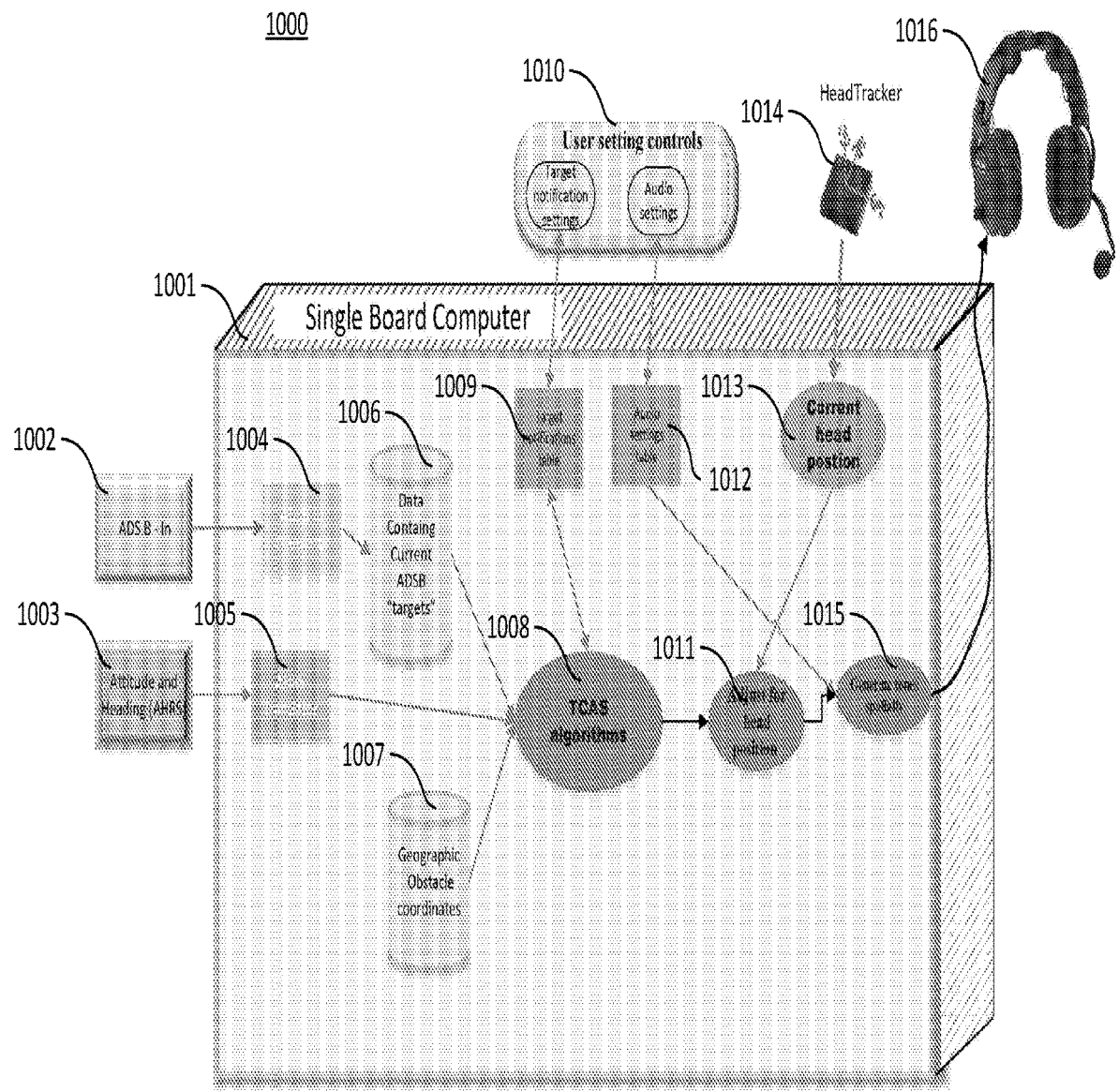
FIG. 10 illustrates an example configurable alert system according to an embodiment.

FIG. 10 illustrates an example configurable alert system according to an embodiment. In some embodiments, configurable alert system 1000 may be portable and removable from an aircraft. In some embodiments, configurable alert system 1000 may be permanently or semi-permanently installed in an aircraft. Configurable alert system 1000 receives Automatic Dependent Surveillance-Broadcast (ADS-B) In input 1002 and Attitude and Heading Reference System (AHRS) input 1003. ADS-B In input 1002 may include Flight Information Services-Broadcast (FIS-B), Traffic Information Service-Broadcast (TIS-B) data, and other data such as direct communication from nearby aircraft including navigation and location information. Examples of navigation and location information included in ADS-B include Global Positioning System (GPS) coordinates and other Global Navigation Satellite System (GNSS) coordinates, for example. AHRS input 1003 may include attitude information of an aircraft in multiple axes including roll, pitch and yaw. ADS-B In input 1002 may be received by ADS-B In Translator 1004 which translates received ADS-B In data into a set of targets which are stored in database 1006. These ADS-B targets from database 1006 are received by Traffic Collision Avoidance System (TCAS) processor 1008. AHRS input 1003 may be processed by AHRS translator 1005 and the resultant translated AHRS data also received by TCAS processor 1008. TCAS processor 1008 also receives indications of geographic obstacles from geographic obstacle coordinate database 1007. TCAS processor 1008 models a three dimensional map of other aircraft and obstacles in the airspace around the aircraft, incorporating the information received from ADS-B In input 1002 and geographic obstacle coordinate database 1007. Then, TCAS processor 1008 extrapolates the aircraft's current attitude and position received from AHRS input 1003 to determine if a potential collision threat exists. In an embodiments, TCAS processor 1008 may be executed on single board computer 1001.

TCAS processor 1008 receives target notification settings from target notifications table 1009. Target notifications table 1009 may receive input from user setting controls 1010, for example. In an embodiments, user setting controls may include various knobs, switches, buttons, and other such user interface elements to receive a user's settings. In some embodiments, user setting controls may include touchscreen computer displays operating a graphical user interface for receiving user setting controls.

TCAS processor 1008 outputs a list or collection of all targets that satisfy the target notifications settings. In some embodiments, target notification settings may include a range setting such that TCAS processor 1008 outputs a collection of all targets that are within a threshold range from the aircraft. In some embodiments, target notification settings may include an estimated time to impact setting such that TCAS processor 1008 outputs a collection of all targets that have an estimated time to collision with the aircraft as determined by TCAS processor 1008. In all embodiments, TCAS processor 1008 outputs a collection or list of targets for which an alert is to be issued to a pilot. TCAS processor 1008 compares the position and attitude of the aircraft as determined from AHRS with the positions of any targets, so that a heading and range to each target relative to the aircraft is determined.

Head position processor 1011 receives a head position 1013 from a head tracker 1014. Head tracker 1014 may be a positional sensor unit attached to a pilot's head in some embodiments. For example, a pilot's headset may include head tracker 1014 which may be comprised of a multi-axis inertial measurement unit. In some embodiments, head tracker 1014 may be comprised of one or more cameras which determine a position of a pilot's head in a cockpit of the aircraft.

Head position processor 1011 determines an adjusted heading or direction of targets relative to a pilot's head direction. In some embodiments, a pilot's head direction or gaze may be received in relation to the aircraft, or in an aircraft-centered frame of reference. In other embodiments, a pilot's head direction or gaze may be received in relation to a global frame of reference. In some embodiments, the pilot's head direction or gaze may be adjusted from a global frame of reference to an aircraft-centered frame of reference, or vice versa. Similarly, a heading or direction of a target may be determined in relation to the aircraft or in relation to a global frame of reference. In some embodiments, the heading or direction of targets may be adjusted from a global frame of reference to an aircraft-centered frame of reference, or vice versa. In an example, when a target heading and a pilot's gaze are in the same frame of reference, head position processor 1011 may determine an adjusted heading of the target to the pilot's gaze by determining the difference in the direction of the pilot's gaze and the direction of the target.

Tone generator 1015 then generates a set of three-dimensional tones for each target. In an embodiments, tone generator 1015 may employ a Head-Related Transfer Function (HRTF) to synthesize a spatial tone corresponding to the position of targets relative to the pilot's head. Tone generator 1015 receives audio settings from audio settings table 1012 which may specify various parameters to generate tones by. For example, one audio setting may be a volume of tones to generate. Audio settings table 1012 may include audio settings receives from user settings controls 1010 or from other sources of audio settings. Tones generated by tone generator 1015 are played to a pilot headset 1016. Pilot headset 1016 maybe a two-channel stereo or binaural headset, for example.

Figure 11A:
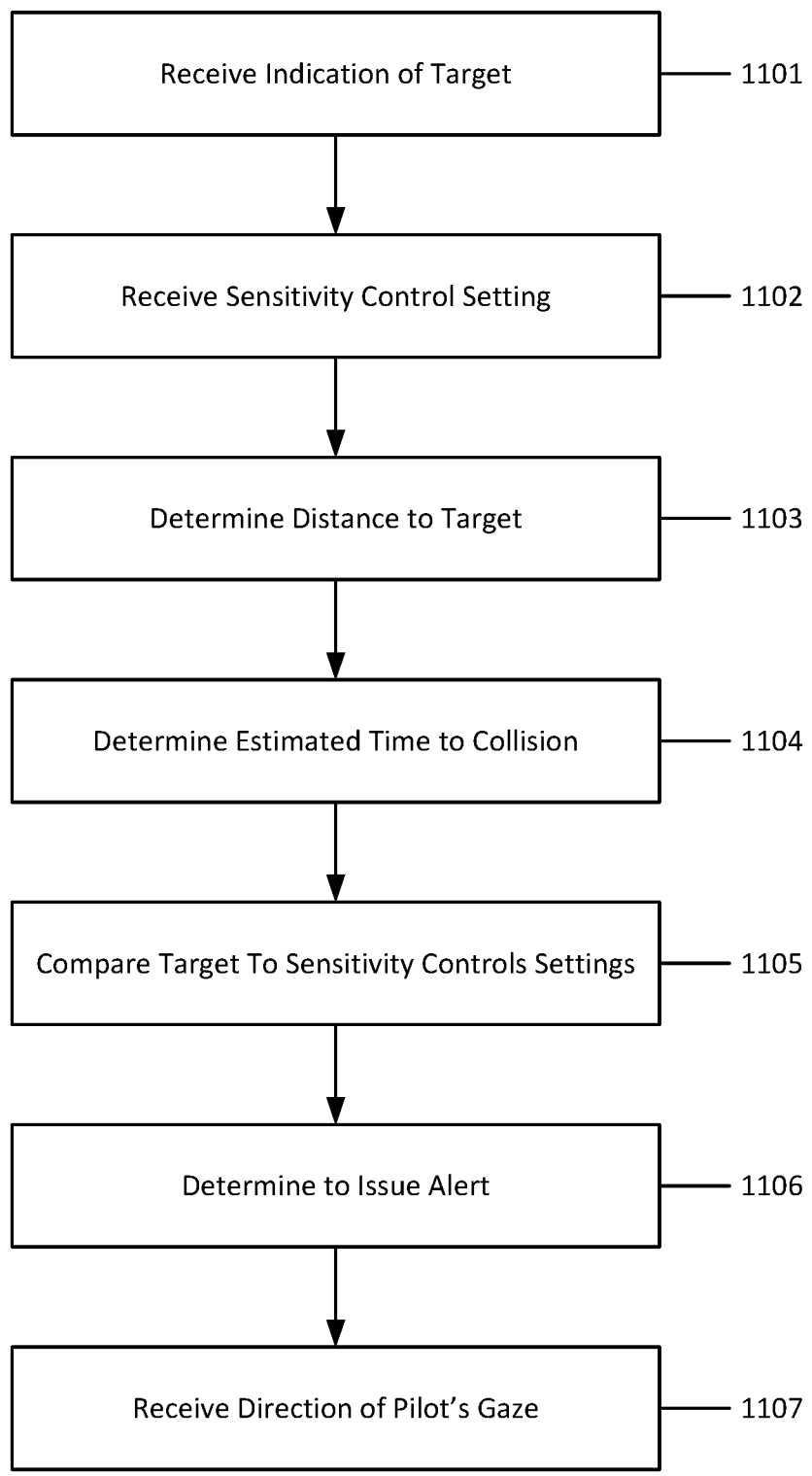
FIGS. 11A-B illustrate the steps of a method for configuring alerts for an alert system according to an embodiment.
Figure 11B:
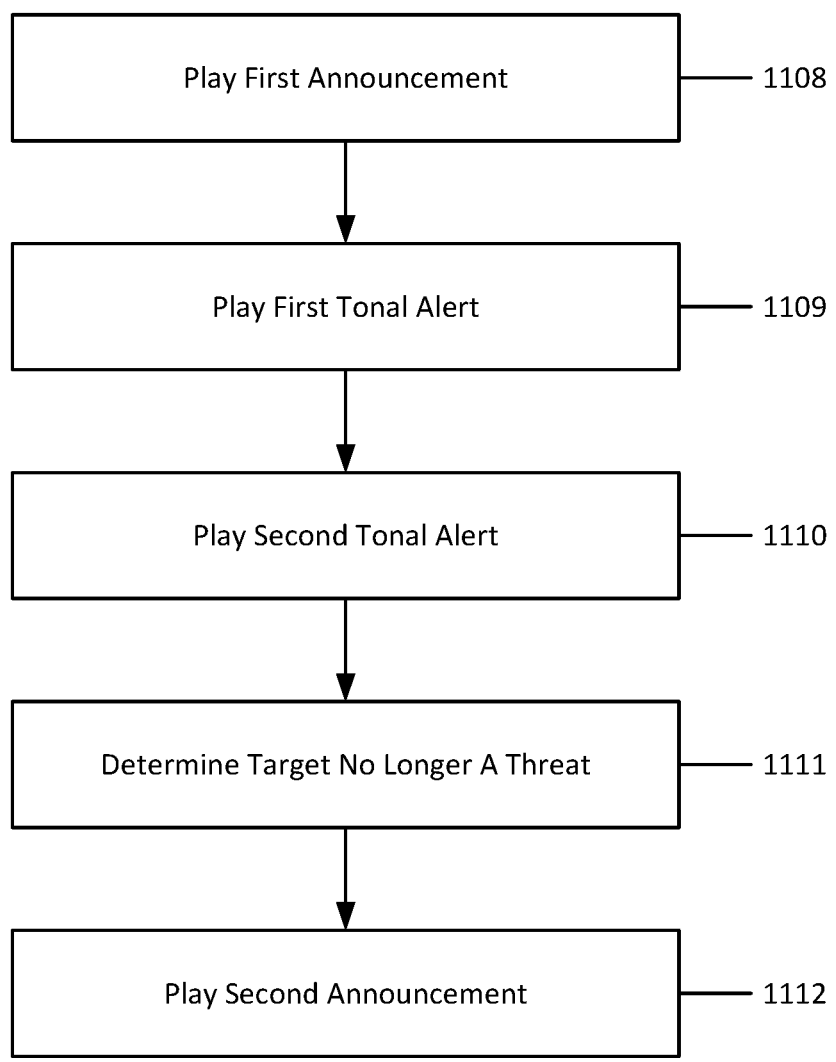

FIGS. 11A-B illustrates the steps of a method for configuring alerts for an alert system according to an embodiment. The alert system may be operating in an aircraft such as described in connection with FIG. 10, for example.

At step 1101, an indication of a target aircraft is received. In some embodiments, an indication of a target aircraft may be received from a TCAS or ADS-B system, for example. The indication may include an altitude of the target aircraft, a range to the target aircraft, and bearing of the target aircraft. The indication may include an estimated velocity and heading of the target aircraft in some embodiments as well. The estimated velocity and heading of the target aircraft may be determined based on the range, altitude, and bearing of the target aircraft as observed over a period of time.

At step 1102, a sensitivity control setting is received including either a configured threshold time to collision or a configured threshold distance to a target aircraft. The sensitivity control setting sets thresholds for determining when to alert a pilot about a target aircraft. In an example, three sensitivity settings may be selectable. A first setting may specify a range threshold of 1200 feet or a time to impact threshold of 15 seconds, for example. A second setting may specify a range threshold of 2400 feet or a time to impact threshold of 30 seconds, for example. A third setting may specify a range threshold of 1 mile or a time to impact threshold of 60 seconds, for example. In various embodiments, other numbers of sensitivity settings may be specified, and other values of range thresholds and time to impact thresholds may be used. In general, range thresholds may be anywhere from 0-2 miles, and time to impact thresholds maybe anywhere from 0 to 120 seconds in some embodiments.

In addition, one or more sensitivity settings may indicate a mute condition. For example, a sensitivity setting may temporarily mute any alerts. In another example, another sensitivity setting may permanently mute any alerts.

The sensitivity control setting may be received from a variety of sources. In some embodiments, a rotary dial located in an aircraft cockpit may be used to select one of a plurality of settings by a pilot. In some embodiments, a graphical user interface of a computing system may be used by a pilot to select one of a plurality of sensitivity settings. In general, any type of user interface present in an aircraft cockpit may be the source of a sensitivity setting.

In some embodiments, a sensitivity setting may be automatically selected by the alert system based on environmental conditions. For example, a geofenced area may be associated with a particular sensitivity setting, and the alert system may automatically select that sensitivity setting when the aircraft is in that geographic area. In another example, a condition of local aircraft traffic may be used to determine a sensitivity setting automatically. For example, a large number of aircraft in a local vicinity may cause the alert system to automatically select a sensitivity with lower thresholds to reduce false positive alerts, and a very sparse local traffic environment may cause the alert system to automatically select a sensitivity with greater thresholds to alert a pilot of potential threats from a greater distance. In another example, local weather conditions may cause the alert system to automatically select a sensitivity setting. Different visibility conditions or severe weather may cause the system to automatically select a sensitivity setting appropriate for those conditions, for example.

At step 1103, a distance to the target aircraft is determined. In embodiments where range information was received in step 1101, the received range information may be used as the distance to the target aircraft. In embodiments where an absolute position of the target aircraft is received, a distance to the target aircraft may be determined by determining a distance between the location of the aircraft to the target aircraft.

At step 1104, an estimated time to collision between the aircraft and the target is determined. In some embodiments, the estimated time to collision may be received from a TCAS system, for example.

At step 1105, the determined distance to the target aircraft is compared with the threshold distance set by the sensitivity setting received in step 1102. The determined estimated time to collision is also compared with the threshold time to collision set by the sensitivity setting in step 1102.

If either the distance to the target aircraft or the estimated time to collision is below the thresholds set by the sensitivity setting, at step 1106 the alert system continues to issue an alert about the target aircraft. In some embodiments, the alert system issues alerts about a target aircraft if the distance to the target aircraft is below a distance or range threshold set by the sensitivity setting. In some embodiments, the alert system issues alerts about a target aircraft if an estimated time to collision is less than a time threshold set by the sensitivity setting.

Having determined an alert condition in step 1106, at step 1107 the alert system receives a direction of a pilot's gaze. In some embodiments, a pilot's gaze may be received from a head-tracking device attached to a pilot's head. For example, a head-tracking device may be attached to a helmet or headset a pilot is wearing on their head. In some embodiments, a pilot's gaze may be received from an eye-tracking device configured to track the eye movement of a pilot.

In some embodiments, a head-tracking device may use an inertial measurement unit attached to a pilot's head to determine a position of the pilot's head. The relative position of a pilot's head may be determined by comparing an absolute position of a pilot's head with a position of a frame of reference such as an aircraft cockpit, for example. A direction or attitude of the aircraft may be determined by an AHRS system of the aircraft in some embodiments.

In some embodiments, a direction of a pilot's gaze may be determined by one or more imaging devices. For example, one or more cameras mounted in the cockpit of an aircraft may capture images of a pilot, and a direction of the pilot's gaze determined from the images of the pilot.

At step 1108, a first announcement of the target aircraft is issued to a pilot. In some embodiments, a verbal announcement of the target aircraft may be played through an audio interface such as a headset that a pilot is wearing. In some embodiments, a visual announcement may be issued in addition to or in place of a verbal announcement as well. A verbal announcement may be synthesized by the alert system. The verbal announcement may indicate the existence of a new target and heading of the new target. For example, a verbal announcement may be "new target, eight o'clock high" to indicate a new target at a relatively higher altitude at a certain heading. Other formats or conventions may be used to form verbal announcements, such as reciting different forms of altitude information (e.g., "1,000 feet above") or heading information (e.g., "230 degrees").

At step 1109, a first tonal alert is issued to a pilot. In an embodiment, the first tonal alert may comprise a doppler effect tone which indicates a relative direction of travel of the target aircraft. For example, the doppler effect tone may include a series of tones played at a rate that changes with the rate of closure of the target aircraft. In some embodiments, the tone rate or frequency may be proportional to the rate of closure between the aircraft and the target aircraft. In some embodiments, the rate or frequency may be linearly related to the rate of closure between the aircraft and the target aircraft. In some embodiments, the rate or frequency may be non-linearly related to the rate of closure between the aircraft and the target aircraft. In some embodiments, the rate or frequency may be monotonically increasing with the rate of closure between the aircraft and the target aircraft. For example, a target aircraft closing at a rapid rate may cause the alert system to issue a first tonal alert that is comprised of a doppler tone that is comprised of a first frequency, and a target aircraft closing at a slower rate may cause the alert system to issue a first tonal alert that is comprised of a doppler tone of a second frequency lower than the first frequency. A target aircraft travelling away from the aircraft may cause the alert system to issue a first tonal alert that is comprised of a doppler tone that is comprised of a third frequency lower than the second frequency. As the aircraft and the target aircraft move, the first tonal alert is updated to reflect the instantaneous rate of closure of the target aircraft to the aircraft.

At step 1110, a second tonal alert is issued to a pilot. In an embodiment, the second tonal alert may be a lock on tone that is altered based on the relative difference between the direction of the pilot's gaze and the direction of the target aircraft. For example, the second tonal alert may be comprised of a tremolo effect tone which is modulated based on a relative difference between the direction of the pilot's gaze and the direction of the target aircraft. In an embodiment, the second tonal alert may be a tremolo effect tone which is activated when the pilot's gaze is not directed toward the target aircraft and is deactivated when the pilot's gaze is directed toward the target aircraft. Determining whether or not the pilot's gaze is directed toward the target aircraft may be accomplished by determining a difference between the pilot's gaze and the direction of the target aircraft and comparing the difference to a threshold, such that if the difference is greater than the threshold it is determined that the pilot's gaze is not directed toward the target aircraft and if the difference is less than than the threshold it is determined that the pilot's gaze is directed toward the target aircraft.

In an embodiment, a volume or intensity of the second tonal alert may be modulated based on the difference between the pilot's gaze and the target aircraft. For example, rather than the binary activating and deactivating as described above, a volume of the second tonal alert may be increased the further the pilot's gaze is from the target aircraft, and the volume of the second tonal alert may be decreased as the pilot's gaze is drawn to the direction of the target aircraft. In some embodiments, a frequency or beat frequency of the second tonal alert may be modulated rather than a volume.

Each of the first announcement of step 1108, first tonal alert of step 1109, and second tonal alert of step 1110 (hereinafter the "alerts") are issued to a pilot using positional audio. For example, if a pilot is wearing a stereo headset, the alerts may be played in the pilot's headset using a simulated three-dimensional effect that creates a perception that the alerts are arriving from the direction of the target aircraft. The three-dimensional sound effect creates a perception of the alert sounds being localized in the direction of the target aircraft.

In some embodiments this simulated three-dimensional sound effect may include using a head-related transfer function (HRTF) to simulate the sound of the alerts coming from the direction of the target aircraft. In general, any combination of phase, intensity, volume, frequency response, or any other characteristic of the sounds that comprise the alerts may be altered to create the three-dimensional sound effect. The three-dimensional effect may include any combination of monoaural or binaural cues to simulate a three-dimensional sound field for a pilot through a monoaural, binaural, or stereo headset or other audio interface.

The first tonal alert of step 1109 and second tonal alert of step 1110 may continue as long as the target aircraft is within the thresholds set by the sensitivity setting. When a pilot's gaze is directed at the target aircraft, even if the second tonal alert may be muted or off, the first tonal alert may continue to convey a rate of closure of the target aircraft.

At step 1111, the target aircraft has exceeded the thresholds set by the sensitivity setting. For example, if the sensitivity setting is specified as a range threshold, at step 1111 the target aircraft has travelled away from the aircraft so that it is outside of the range threshold. Similarly, if the sensitivity setting is specified as a time to impact threshold, at step 1111 the aircraft has adjusted its course such that any estimated time to impact is greater than the time to impact threshold time. At step 1112, the alert system may issue a second verbal announcement indicating that the alert system is no longer issuing alerts for the target aircraft. In an example, the second verbal announcement may be "target no longer a factor," "intruder is no longer a threat," or "clear of conflict," for example.

In the examples described above, the alert system is discussed in the context of a first aircraft and a second target aircraft. In various embodiments, the alert system may be used in different contexts and frames of reference. For example, the alert system may be used to alert a pilot in a first aircraft about stationary ground-based obstacles. Similarly, the alert system may be used to alert a stationary ground-based operator as to incoming aerial assets such as aircraft. In some embodiments, a ground-based operator may be alerted using the alert system as to other ground-based objects, with either the operator or the objects or both the operator and the objects being mobile. For example, an operator in a ground-based vehicle may be alerted about target ground-based vehicles.

Some embodiments may include an alert system configuration interface. In an embodiment, a rotary knob may be rotated to select a desired target notification setting. A first setting of the rotary knob is an automatic setting which instructs an alert system to automatically determine a target notification setting. A second setting of the rotary knob is a standby setting which instructs an alert system to disengage and stop. Third, fourth, and fifth settings of the rotary knob are progressively broader target notification settings with the third setting specifying a most narrow setting and the fifth setting specifying a broadest setting. In some embodiments, the third, fourth, and fifth settings may specify three increasing ranges to targets such that the third setting specifies a closest range of operation and the fifth setting specifies a farthest range of operation. In these embodiments, an alert system may issue alerts for targets within the specified range, for example. In some embodiments, the third, fourth, and fifth settings may specify three increasing estimated times to collision such that the third setting specifies a shortest time to collision and the fifth setting specifies a longest time to collision. In these embodiments, an alert system may issue alerts for targets that have an estimated time to collision sooner than the specified time threshold as determined by a TCAS system, for example. In addition to the rotary knob, the example alert system configuration interface also includes a mute button which operates to mute auditory alerts. In some embodiments, an alert system may continue to track targets and generate alerts when muted.

Figure 12:
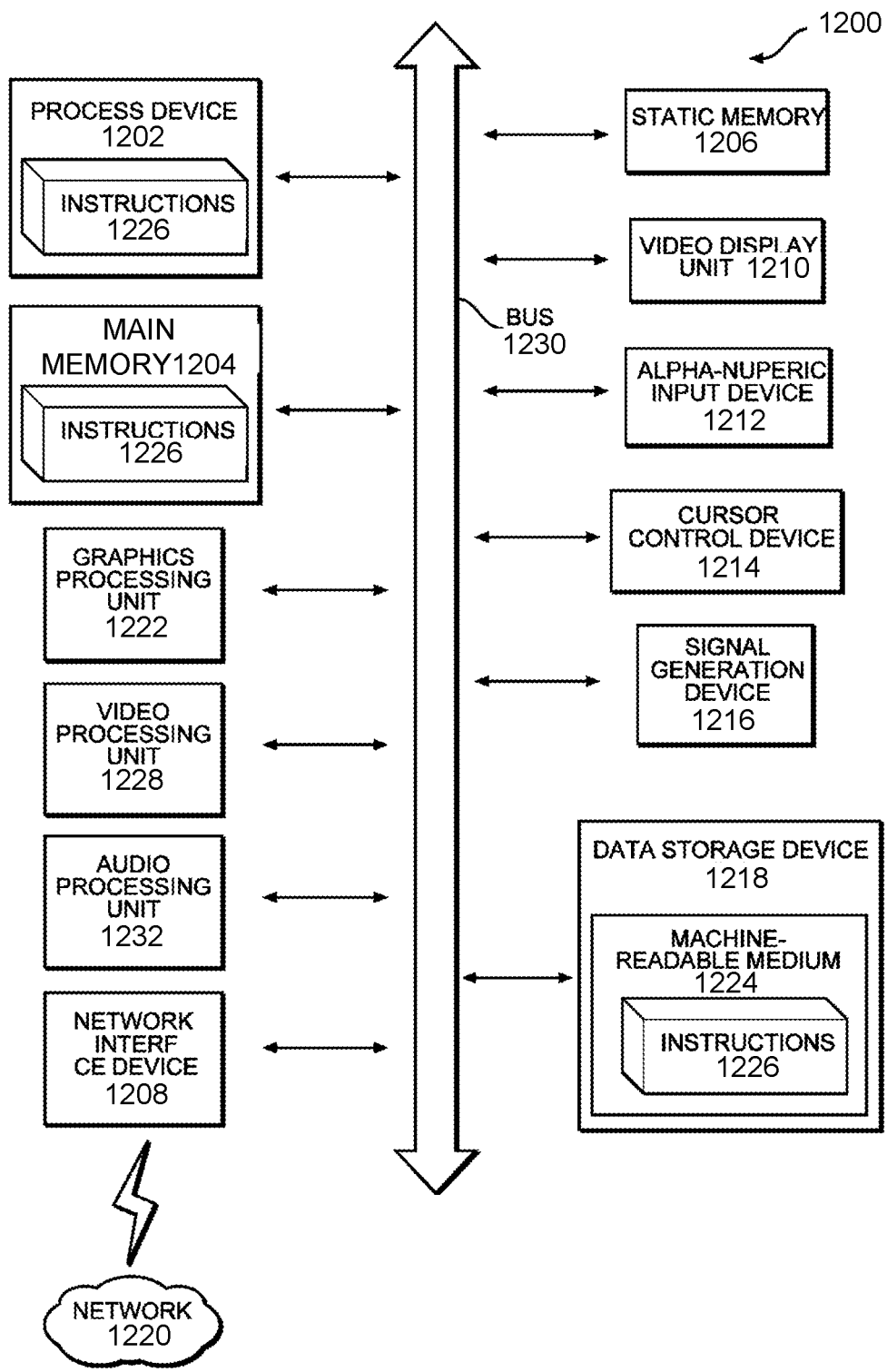
FIG. 12 illustrates an example machine of a computer system for performing any one or more of the methodologies discussed herein.

FIG. 12 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1215 (e.g., a mouse), a graphics processing unit 1222, a signal generation device 1216 (e.g., a speaker), video processing unit 1228, and audio processing unit 1232.

The data storage device 1218 may include a machine-readable storage medium 1224 (also known as a computer-readable medium) on which is stored one or more sets of instructions or software 1226 embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1226 include instructions to implement functionality corresponding to the components of a device to perform the disclosure herein. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

As such, from the foregoing description, one skilled in the art can readily ascertain the essential characteristics of the embodiments, and without departing from the spirit and scope thereof, can make various changes and/or modifications to the embodiments to adapt them to various usages and conditions.

What is claimed is:

1. A method of configuring alerts for an aircraft piloted by a pilot, the method comprising:
receiving, by the aircraft, an indication of a target;
receiving a direction of the pilot's gaze;
playing a doppler effect tone via the headset comprising a series of tones played at a rate determined by a rate of closure between the aircraft and the target; and
wherein the doppler effect tone is played using a three-dimensional audio effect to simulate the doppler effect tone coming from the direction of the target relative to the direction of the pilot's gaze.

2. The method of claim 1, further comprising:
receiving a sensitivity control setting;
wherein the sensitivity control setting includes a threshold range, and wherein an alert condition is determined in response to determining that the distance from the aircraft to the target is below the threshold range.

3. The method of claim 1, further comprising:
receiving a sensitivity control setting;
wherein the sensitivity control setting includes a threshold time to collision, and wherein an alert condition is determined in response to determining that the estimated time to collision between the aircraft and the target is shorter in duration than the threshold time to collision.

4. The method of claim 1, wherein the direction of the pilot's gaze is received from a head-tracking unit attached to a headset.

5. The method of claim 1, wherein the direction of the pilot's gaze is determined by analyzing images of the pilot.

6. The method of claim 1, further comprising:
determining an end to an alert condition; and
playing an audio announcement via a headset announcing the end of the alert condition.

7. The method of claim 1, wherein the target is another aircraft.

8. An aircraft piloted by a pilot comprising:
a control system of the aircraft for configuring alerts for the aircraft, the control system comprising a non-transitory computer-readable medium, and the non-transitory computer-readable medium comprising instructions for:
receiving, by the aircraft, an indication of a target;
receiving a direction of the pilot's gaze;
playing a doppler effect tone via the headset comprising a series of tones played at a rate determined by a rate of closure between the aircraft and the target; and
wherein the doppler effect tone is played using a three-dimensional audio effect to simulate the doppler effect tone coming from the direction of the target relative to the direction of the pilot's gaze.

9. The aircraft of claim 8, further comprising a sensitivity control setting wherein the sensitivity control setting includes a threshold range, and wherein an alert condition is determined in response to determining that the distance from the aircraft to the target is below the threshold range.

10. The aircraft of claim 8, further comprising a sensitivity control setting wherein the sensitivity control setting includes a threshold time to collision, and wherein an alert condition is determined in response to determining that the estimated time to collision between the aircraft and the target is shorter in duration than the threshold time to collision.

11. The aircraft of claim 8, wherein the direction of the pilot's gaze is received from a head-tracking unit attached to a headset.

12. The aircraft of claim 8, wherein the direction of the pilot's gaze is determined by analyzing images of the pilot.

13. The aircraft of claim 8, wherein the non-transitory computer-readable medium further comprises instructions for:
determining an end to an alert condition; and
playing an audio announcement via a headset announcing the end of the alert condition.

14. The aircraft of claim 8, wherein the target is another aircraft.

15. A method of alerting a pilot of an aircraft about a potential collision with a target, the method comprising:
receiving, by a control system of the aircraft, a direction of the pilot's gaze relative to the aircraft;
receiving, by the aircraft, a direction of the target relative to the aircraft;
playing a tone when the relative difference between the direction of the pilot's gaze and the direction of the target is above a threshold.

16. The method of claim 15, further comprising muting the tone when the relative difference between the direction of the target relative to the direction of the pilot's gaze is lower than the threshold.

17. The method of claim 15, wherein the tone is played through a headset of the pilot using a simulated three-dimensional audio effect to create a perception that the tone is emanating from the direction of the target relative to the pilot's gaze.

18. The method of claim 15, further comprising modulating an intensity of the tone based on the direction of the target relative to the pilot's gaze.

19. The method of claim 15, wherein the distance to the target from the aircraft is below a sensitivity control threshold distance.

20. The method of claim 15, wherein an estimated time to collision between the target and the aircraft is below a sensitivity control threshold time.

* * * * *